United States Patent
Chandramohan et al.

(10) Patent No.: US 10,229,361 B2
(45) Date of Patent: Mar. 12, 2019

(54) INCIDENT PREDICTION SYSTEM

(71) Applicant: International Business Machines Corporation, Armonk, NY (US)

(72) Inventors: Sarika Chandramohan, San Diego, CA (US); Pankaj S. Dayama, Bangalore (IN); Saurabh Gupta, Delhi (IN); Mark A. Weitner, Old Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 14/742,765

(22) Filed: Jun. 18, 2015

(65) Prior Publication Data
US 2016/0371597 A1    Dec. 22, 2016

(51) Int. Cl.
*G06N 5/02* (2006.01)
*G06N 7/00* (2006.01)

(52) U.S. Cl.
CPC ............ *G06N 7/005* (2013.01); *G06N 5/02* (2013.01)

(58) Field of Classification Search
CPC .............................. G06N 5/04; G06N 99/005
See application file for complete search history.

(56) References Cited

U.S. PATENT DOCUMENTS

| 8,614,633 | B1 | 12/2013 | Lear et al. |
| 8,688,429 | B2 | 4/2014 | Nasle et al. |
| 8,760,290 | B2 | 6/2014 | Piett et al. |
| 2005/0147949 | A1 | 7/2005 | Wilson |
| 2006/0085393 | A1 | 4/2006 | Modesitt |
| 2009/0089108 | A1* | 4/2009 | Angell .................. G06Q 10/00 705/7.28 |
| 2011/0307293 | A1 | 12/2011 | Smith |
| 2012/0317058 | A1* | 12/2012 | Abhulimen .......... G06N 99/005 706/2 |
| 2016/0140212 | A1* | 5/2016 | Hodas ............... G06F 17/30705 707/738 |

OTHER PUBLICATIONS

Yu, Lei, and Huan Liu. "Feature selection for high-dimensional data: A fast correlation-based filter solution." Proceedings of the 20th international conference on machine learning (ICML-03). 2003.*

(Continued)

*Primary Examiner* — Eric Nilsson
(74) *Attorney, Agent, or Firm* — Erik K. Johnson

(57) ABSTRACT

The present invention may be a method, computer program product, and system for predicting future safety incidents. The embodiments may receive a first set of incident data about a first safety incident. The first set of data may include a first set of factors and a first severity. The embodiments may create a safety incident model based on the first set of data by correlating the first set of factors with the first severity. The embodiments may receive a second set of incident data, where the second set of data may include a second set of factors. The embodiments may determine a predicted severity of the second set of incident data based on the safety incident model and the second set of factors. The embodiments may display one or more factors from one of the first and second set of factors, having the highest predicted incident severity.

14 Claims, 3 Drawing Sheets

(56) References Cited

OTHER PUBLICATIONS

Emerson, "SmartRefinery," http://www2.emersonprocess.com/siteadmincenter/PM%20Articles/SmartRefinerySupplement_Sept2010_Final.pdf, Sep. 2010, 24 pages.

Chen et al, "A predictive risk index for safety performance in process industries," Journal of Loss Prevention in the Process Industries, vol. 17, Issue 3, May 2004, doi:10.1016/j.jlp.2004.03.001, pp. 233-242.

Honeywell, "Integrated Fire and Gas Solution—Improves Plant Safety and Business Performance," Honeywell Process Solutions, URL:https://www.honeywellprocess.com/library/marketing/whitepapers/FireGasSystem_Whitepaper_April09.1.pdf, Apr. 2009, 11 pages.

* cited by examiner

INCIDENT PREDICTION SYSTEM

BACKGROUND

The present invention relates to the determination of hazards on industrial sites, and more particularly to the use of historical data to predict safety incidents.

Preventing Health, Safety and Environment (HSE) incidents on job sites is a goal of many corporations and governments. Human analysis mechanisms such as process hazard analysis, hazard and operability studies and root cause analysis may be used to create a high level understanding of how an incident relating to process operations may occur, but such mechanisms do not fully account for all operational and human factor failures, or the combination of these failures and their relationships, that may lead to safety incidents. Traditionally, safety incidents are only analyzed after the event occurs, and large changes tend to only be made when severe incidents occur.

BRIEF SUMMARY

Embodiments of the present invention disclose a method, computer program product, and system for predicting future safety incidents. The embodiments may receive a first set of incident data about a first safety incident. The first set of incident data may include a first set of factors and a severity of the first safety incident. The embodiments may create a safety incident model based on the first set of incident data by correlating the first set of factors with the severity of the first safety incident. The embodiments may receive a second set of incident data, where the second set of incident data may include a second set of factors. The embodiments may determine a predicted severity of the second set of incident data based on the safety incident model and the second set of factors from the second set of incident data. The embodiments may display one or more factors from one of the first and second set of factors, having the highest predicted incident severity.

DETAILED DESCRIPTION

Embodiments of the present invention are directed generally to a system that gathers information about job incidents and creates a predictive model correlating the factors contributing to the job incident with the severity of the job incident, and then uses the predictive model to determine high-risk factors that should be mitigated. The job incidents may be safety incidents, monetary incidents, environmental incidents and non-event incidents. A safety incident may be any incident that leads to an injury of a worker at a manufacturing facility. A monetary incident may be any incident that results in loss of production time, or damage to existing equipment at a manufacturing facility. An environmental incident may be any incident that results in a release of a chemical that may have detrimental impacts on the environment. A non-event incident (e.g. unsafe conditions, hazards, near misses) may be any job incident that does not result in a monetary incident, environmental incident or a safety incident, and contains the same, or similar, causes as monetary incidents, environmental incidents and safety incidents. By analyzing the large amounts of data contained in incident reports and creating a predictive model, risk factors may be determined and preventative action may be taken to reduce the severity during an occurrence of safety, environmental or monetary incidents. In a preferred embodiment, safety incidents are correlated to incident reports created by personnel on the job site, and those job site incident reports are used to predict possible severity of harm.

Figure 1:
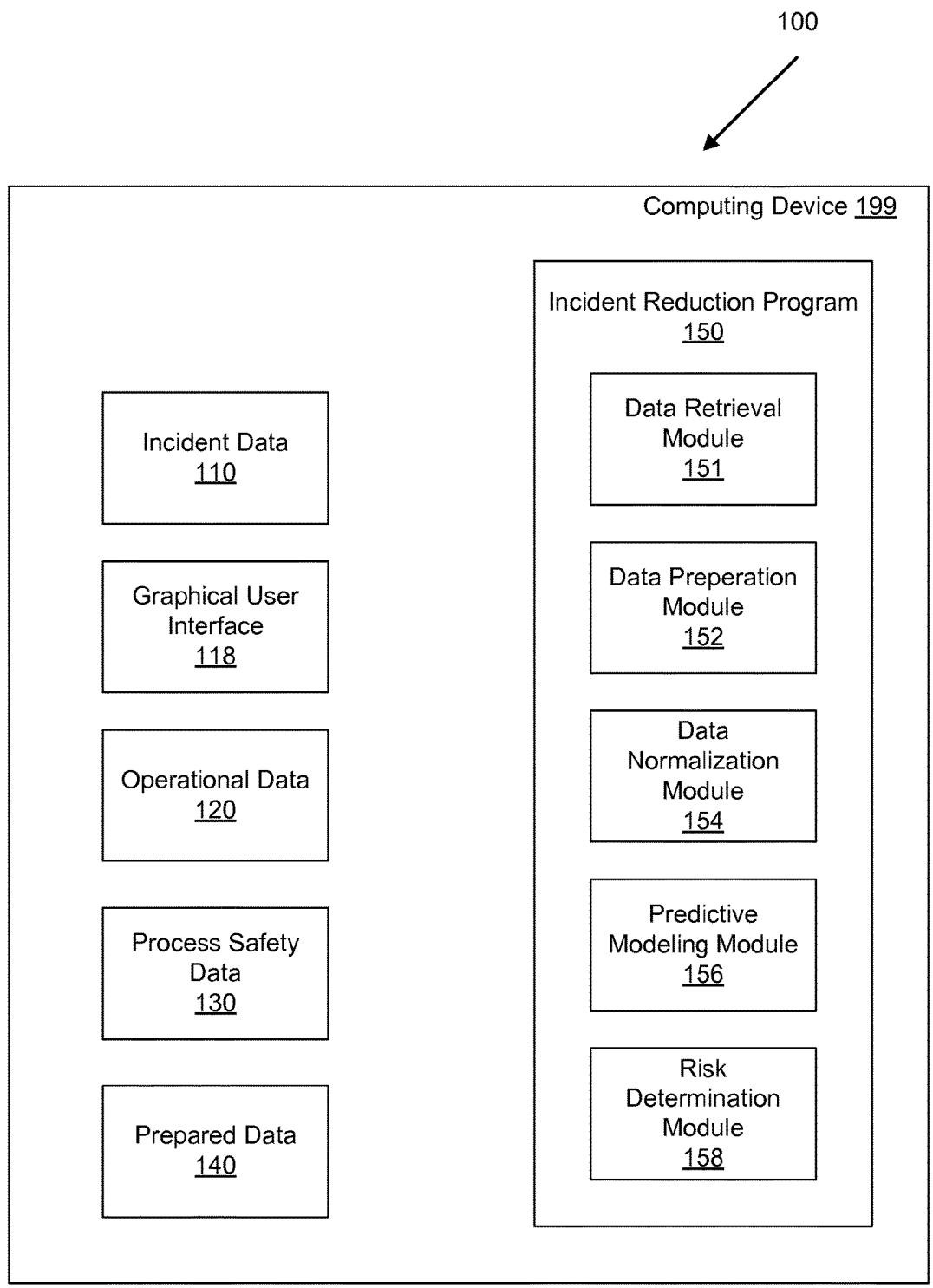
FIG. 1 illustrates a database comparison environment, in accordance with an embodiment of the invention.

FIG. 1 illustrates an incident detection system 100, in accordance with an embodiment of the invention. In an example embodiment, incident detection system 100 includes a computing device 199. The incident detection system receives reports from multiple users across a job site detailing HSE incidents, and non-incidents. The incident detection system looks for the factors contributing to such incidents, and creates a model relating the contributing factors to the severity of an incident. The model may then be used to evaluate the contributing factors to determine which factors should be mitigated to reduce the likelihood or severity of future HSE incidents.

User computing device 199 represents a user computing environment that receives incident information, and may create an incident model based on the incident information. In the example embodiment, user computing device 199 may be a desktop computer, a notebook, a laptop computer, a thin client, or any other electronic device or computing system capable of receiving information and compiling the information in order to create a predictive model, in accordance with one or more embodiments of the invention. User computing device 199 may include incident data 110, operational data 120, process safety data 130, prepared data 140 and incident reduction program 150. User computing device 199 may contain internal and external hardware components, as depicted and described in further detail below with reference to FIG. 3.

Graphical user interface (GUI) 118 represents a user interface for users to enter relevant information pertaining to a job incident, which is stored as incident data 110. GUI 118 may include any application capable of displaying a form having the necessary places to input structured, semi-structured and text data corresponding to an incident, and storing that data in incident data 110. Each entry into the form may store the entry as the particular data field associated with the entry space, and each entry may be treated as a variable used during operation of the incident reduction program 150, described below. Additionally, GUI 118 may display factors likely to cause severe harm, and possible corrective action, as determined by the incident reduction program 150, and described further below.

Incident data 110 represents a collection of data detailing the specifics, and possible factors, of a job incident. Incident data 110 may be received from multiple users detailing a specific job incident. Each incident may be detailed using a combination of structured data, semi-structured data, and written text. Structured data refers to factors that can only have 1 value. For example, the name of the user inputting the incident data, the job title of the user, the location of the incident, and the severity of the incident may all be forms of structured data included in incident data 110. Semi-structured data refers to factors that may have multiple values at the same time, such as general causes (e.g. work practices, procedures, preventative maintenance), or specific causes (lack of personal protective equipment, safety interlock override, improper lock-out/tag-out). Written text pertains to a written explanation of an incident, detailing the possible causes of the incident. Incident data 110 may also include incident assessments, whereby the incident assessment specifies the type of corrective action taken after an incident occurred in order to try to prevent recurrence of the incident. Incident data 110 may be located on computing device 199.

Operational data 120 represents process variables, operating conditions, alarm conditions and/or interlock conditions. Process variables may pertain generally to the process conditions of the job site such as, for example, flows, temperatures, pressures, volumes, densities, concentrations, or any other relevant process variables. Operating conditions may pertain generally to the operating state of equipment on the job site such as, for example, open/closed valves, operation state of pumps, operation state of impellers, or any other operating parameters. Alarm conditions may pertain to any conditions programmed into the DCS or PLC that notifies an operator that a process variable or operating condition is in an unexpected range or state, respectively. For example, an alarm condition may be a high/low temperature alarm, a high/low flow alarm, etc. Interlock conditions may pertain to any conditions programmed into the DCS or PLC that overrides a desired state in an attempt to stop, or limit, safety incidents, monetary incidents, and/or environmental incidents. For example, an interlock condition may be tripping a pump in low flow conditions, unexpected flows through a pipe, high pressures, etc. Operational data may be located on computing device 199.

Process safety data 130 represents specific known relationships between certain specific variables contained in either the incident data 110 or operational data 120, and may provide context for analyzing the data. Process safety data 130 may be specific relationships between certain pieces of operational data, it may be site specific locations, may be operational changes that may affect the relevance of data from a specific timeframe or it may be relationships between two different locations. The process safety data 130 may be located on computing device 199.

Prepared data 140 is the statistically relevant data from incident data 110 and operational data 120. The data is organized such that all of the factors for an incident are linked to the incident itself. Each factor may contain a metadata tag, or some other type of identifier, detailing the user that entered that piece of information. Additionally, each incident entry contains data pertaining to the severity of the incident.

Incident reduction program 150 receives data surrounding an incident, and creates a model that correlates factors from the incident to the severity of the incident to create a predictive model. The predictive model may then be used to re-analyze the factors for all incidents to determine a predicted incident severity, which may determine possible high risk factors that should be mitigated. Suggestions may be created to mitigate those high risk factors, based on actions that have been historically used to alleviate the risk. Incident reduction program 150 contains data retrieval module 151, data preparation module 152, data normalization module 154, predictive modeling module 156 and risk determination module 158.

Data retrieval module 151 represents a module of incident reduction program 150 that may receive or collect factors corresponding to a specific job incident. Data retrieval module 151 may collect incident data, operational data and/or site data. Incident data pertains to a human analysis of an incident on a job site, detailing the factors such as, for example, location, people involved, time, and possible causes. In some embodiments, one or more users may manually enter the incident data, with aid of GUI 118, into a form. The form may contain multiple factors for one or more users to enter information such as, for example, drop down boxes, selection boxes, or text boxes. This may enable the one or more users to enter the proper information into the proper fields, while giving the flexibility to allow the user to enter any relevant information pertaining to an incident. Additionally, data retrieval module 151 may allow a user to enter any actions that may have been taken to try to prevent recurrences of similar events from occurring. The data retrieval module 151 may then store each field in the proper place of incident data 110, described below.

Data retrieval module 151 may collect operational data from a distributed control system (DCS), programmable logic controller (PLC), or any other system capable of recording process information via a network. Such data may be stored in operational data 120.

Data retrieval module 151 may collect site data from users, detailing specific relationships between physical factors on the plant, such as proximity of work areas, location of machinery, etc. Such data may be stored in process safety data 130.

Data preparation module 152 may prepare the data located in incident data 110 and operational data 120 for subsequent analysis. This may be accomplished by interpreting the written text located in the incident data 110. Data preparation module 152 may extract semantic concepts pertaining to factors involved with each incident from the written text using techniques such as natural language processing. For example, if the written text said "no oil in a pump motor caused the operator to receive burns when he touched the motor" the extracted semantic concepts may be "no oil" and "touched the motor." Another aspect of data preparation module 152 is to remove unnecessary data factors. Data preparation module 152 may remove unnecessary factors from the resulting data set that are known to be unrelated, based on the relationships contained in process safety data 130. For example if a slip and fall were to occur, operational data may be eliminated as a slip and fall is not related to density of a feed material. The remaining data is then stored as prepared data 140.

Data normalization module 154 may remove highly interrelated factors to reduce the computation necessary for predictive modeling module 156, which is discussed below. This may be performed by doing a statistical analysis to determine if two factors are highly coordinated, and thus only one of the factors would be necessary for proper analysis. Statistical techniques such as factor analysis and chi-squared techniques may be used to determine what variables may be highly coordinated. For example, users may enter factors concerning an incident, such as the injured body part and area of the body injured. In such instances, where a user enters that the lower body was injured, and the injury was the person's tibia, due to the factors being highly coordinated, data normalization module 154 would not include one of the factors in the data. In instances where the predictive modeling module 156 is unable to create a predictive model meeting a desired confidence level, data normalization module 154 may increase the number of variables by reintroducing some of the factors that were previously removed.

Predictive modeling module 156 develops a model from the data normalized by data normalization module 154, and creates a model correlating the factors to the occurrence and severity of job incidents. The predictive model created may be an algorithm having following function: (x,Y)=(x1, x2, x3, x4 ... xk, Y) where: Y represents the severity of the incident (severity may be an ordinal variable with levels Low, Medium, High, Very High; or real valued), x represents the incident, and incident and severity are a function of the factors (x1, x2, x3 ... xk). One of the potential models may be based on a decision tree having a sequence of branching operations, where each branch corresponds to a factor and values for each branch are assigned corresponding to the importance of that factor and the severity of the incident. Each level of branching is selected in order to provide better accuracy for the prediction of severity the incidents from prepared data 140. The model may be created by determining each branch sequentially, where the branch is determined by which factor has the most predictive weight, e.g. the factor, in combination with the preceding factors, that has the next predictor of an incident. In determining the predictive weight at each branch, the predictive modeling module 156 may give additional weight the incoming data to adjust model prediction accordingly. In an embodiment, the predictive modeling module 156 may give preference to models that more accurately predict high severity incidents, by giving additional weight at each step to factors that better predict the high severity incidents. This may lead to a model that given two incidents with the same exact factors, where the first incident has Severity of 10 and second incident has severity of 5, a model predicting a severity of 9 could be developed to reflect the additional weight being placed on higher severity incident of 10. In the example embodiment, the predictive model can be created using an n-fold cross validation technique, where n may be 10.

In additional embodiments, in developing a model, the predictive model creation module 156 may weigh each users input for a specific incident relative to other users. These inputs may be weighted based on previous entries by that user, or based on previous entries by users having similar responsibilities to the users. The weighting may be manipulated to treat inputs from certain people, or classes of jobs, as being more predictive or reliable. For example, the predictive model creation module 156 may treat inputs about the HSE incident from a line worker on the job site differently than an area manager, and both may be treated different from a responsible engineer.

Following the creation of the predictive model, a confidence level of the model is created based on how closely the predicted incident severity from the model corresponds to the actual severity from the prepared data 140. The confidence level of the model may be a weighted average of the difference between the predicted incident severity determined by the model based on incident factors contained in prepared data 140, and the actual severity for those incident factors. Similar to above, models will have a higher confidence level when they more accurately predict severe incidents, by adding additional weight when the actual severity is high. If the confidence level is too low, model parameters may be fed back to data normalization module 154, and the data normalization module 154 may modify the number of variables used to create the predictive model.

Risk determination module 158 uses the algorithm created in the predictive model creation module 156 to create a predicted incident severity for each incident. Specifically, the risk determination module 158 inputs the prepared data 140 into the predictive model to determine a predicted incident severity of each incident. The risk determination module 158 may then determine which factors are most likely to lead to a severe incident and report those factors. This may occur by creating an incident severity distribution by statistically analyzing the incident severity for each factor, and finding out the mean and median injury severity for each incident, as well as any statistical distribution for the incident. This may provide a statistical likelihood that any given factor would lead to a severe incident. Additionally, by combining such likelihoods with factors from current incident reports, occurrence rates may be produced detailing how often you'd expect a specific incident severity to occur from a certain factor. This may be done, for example, by multiplying the incident rate by the probability of an incident severity occurring, to determine how often the incident may occur.

The risk determination module 158 may then display factors to be addressed. The risk determination module 158 may display factors based on a ranking system or where such factors create a risk above a certain threshold. For example, the risk determination module may display the top 5 factors that will lead to a severe incident. In another embodiment, the risk determination module 158 may display any factor that is likely to create a severe incident once every 5 years.

In instances where previous preventative actions are known for those risk factors, the risk determination module 158 may provide guidelines to mediate the factors displayed. The preventative actions may be based on corrective actions taken for similar incidents located in incident data 110.

Figure 2:
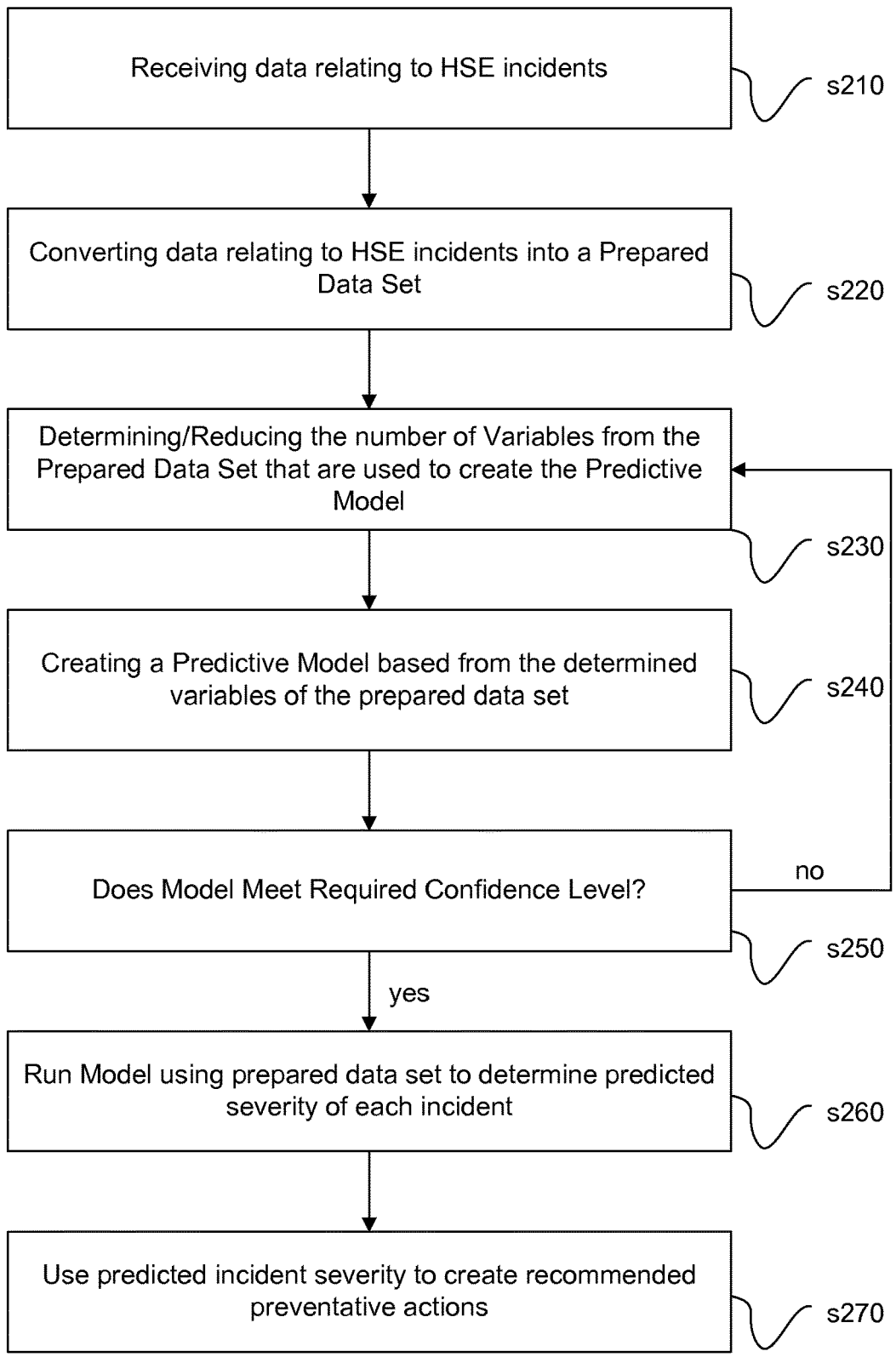
FIG. 2 is a flowchart illustrating the operations of the database comparison program of FIG. 1, in accordance with an embodiment of the invention.

FIG. 2 is a flow chart illustrating a method of operation of the incident reduction program 150 (FIG. 1). Referring to step s210, the incident reduction program 150 receives data relating to HSE incidents. The data may be contained in incident data 110 (FIG. 1), operation data 120 (FIG. 1), or process safety data 130 (FIG. 1). The data may represent incident reports for HSE incidents, or non-event incidents (e.g. unsafe conditions, hazards, near misses), as well as process variables for an operating system and criterion or background describe the relationships between aspects of the data (e.g. locations).

Referring to step s220, the incident reduction program 150 converts the received data into prepared data 140 (FIG. 1). The prepared data 140 has the written text from incident data 110 semantically analyzed to organize the key aspects or concepts. Additionally, the prepared data 140 does not contain unrelated factors, as determined by the relationships contained in process safety data 130.

Referring to step s230, the incident reduction program 150 may reduce the number of variables that are used to create a predictive model, as described below. The variables may be eliminated if 2 or more variables are highly coordinated, such that either variable would accurately predict an outcome. Such variables may be determined using statistical methods, such as chi-squared methods or factor analysis, or may be modified due to feedback from the creation of the predictive model.

Referring to step s240, the incident reduction program 150 may create a model that attempts to predict HSE incidents based on operational and human factors. The model may be created such that the more severe incidents are weighted more heavily, therefore skewing the model to look for factors that lead to incidents with worse outcomes.

Referring to step s250, the incident reduction program 150 checks to see if the model meets a desired confidence level. The confidence level may be determined based on how accurately incidents may be predicted by the factors determined in step s230. If the confidence level is too low, the incident reduction program 150 feeds back the model information to step s230 to determine if more, or less, variables should be used during the next iteration of step s240. Steps s230-s250 repeat until the confidence level of the model meets a threshold criterion, and then proceeds to step s260.

Referring to step s260, the incident reduction program 150 uses prepared data for recent events, and inputs the factors for each incident into the model. The model creates a predicted severity for each incident, and then associates each factor with a predicted risk. The incident reduction program 150 may also predict how likely an incident is to occur based on the factors in the prepared data 140.

Referring to step s270, the incident reduction program 150 may share the high risk factors with the user. If factors correlate to having a risk factor above a certain threshold, a user is notified of the potential for the HSE incident, as well as what factors contributed to the risk factor. Additionally, or alternatively, the incident reduction program 150 may share a certain number of factors, for example the top five that would lead to severe incidents. In instances where corrective actions are contained in the incident data 110, the incident reduction program 150 may also suggest corrective action based on similar incident factors that lead to the corrective action. This may enable users to take corrective action to reduce the risk, or severity, of the possible incidents outlined by the incident reduction program 150.

Figure 3:
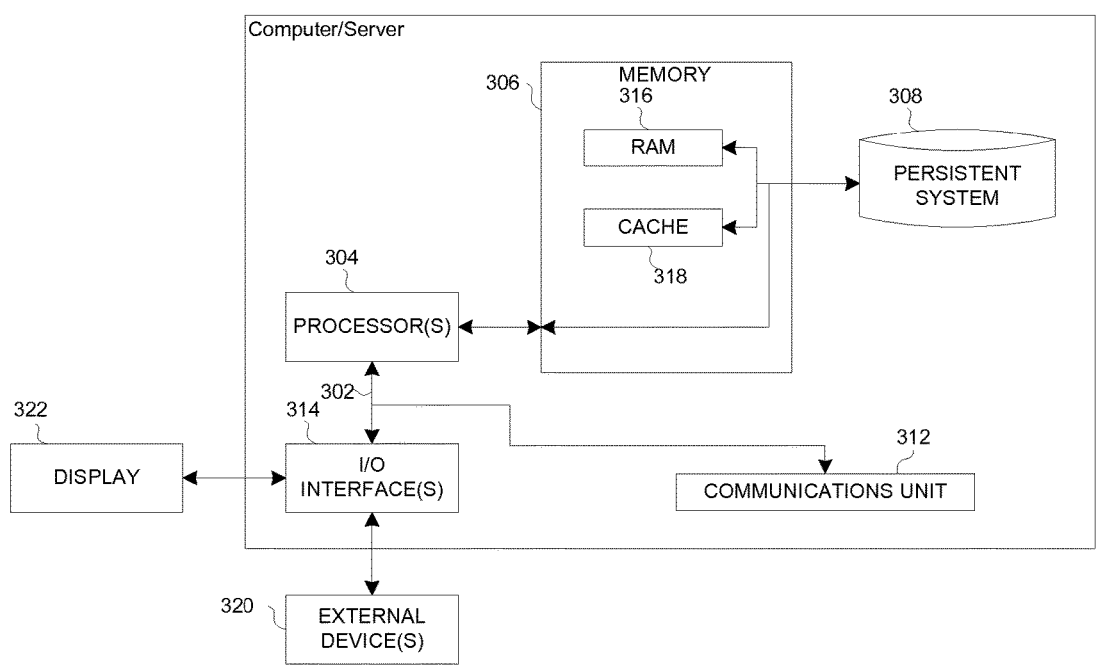
FIG. 3 is a block diagram depicting the hardware components of the computing device of FIG. 1, in accordance with an embodiment of the invention.

FIG. 3 depicts a block diagram of components of computing device 199 (FIG. 1) in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 199 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The incident data 110, operational data 120, process safety data 130, prepared data 140 and incident reduction program 150 containing data retrieval module 151, data preparation module 152, data normalization module 154, predictive modeling module 156, and risk determination module 158, in computing device 199 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The incident data 110, operational data 120, process safety data 130, prepared data 140 and incident reduction program 150 containing data retrieval module 151, data preparation module 152, data normalization module 154, predictive modeling module 156, and risk determination module 158, in computing device 199 may be downloaded to persistent storage 308 through communications unit 312.

I/O interface(s) 314 allows for input and output of data with other devices that may be connected to computing device 199. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the incident data 110, operational data 120, process safety data 130, prepared data 140 and incident reduction program 150 containing data retrieval module 151, data preparation module 152, data normalization module 154, predictive modeling module 156, and risk determination module 158, in computing device 199 can be stored on such portable computer-readable storage media and can be loaded onto persistent storage 308 via I/O interface(s) 314. I/O interface(s) 314 can also connect to a display 322.

Display 322 provides a mechanism to display data and the results from predictive modeling module 156, and risk determination module 158 to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for predicting a severity level for an incident, the method comprising:
  receiving a first set of incident data about a first safety incident, wherein the first set of incident data includes a first set of factors and a severity of the first safety incident, wherein receiving the first set of incident data about the first safety incident further comprises receiving the first set of incident data from a first user and a second user, and wherein the first set of incident data includes written reports of safety incidents, process variables and operating conditions;
  preparing the first set of incident data by determining two factors of the first set of factors that are statistically similar, and retaining only one of the two statistically similar factors in the first set of incident data, wherein preparing the first set of incident data comprises removing irrelevant factors of the first set of factors based on known relationships received from a third user, and wherein preparing the first set of incident data comprises extracting semantic concepts from the written reports;

creating a safety incident model based on the first set of incident data by correlating the first set of factors with the severity of the first safety incident, wherein creating the safety incident model further comprises allocating a higher weight to incident data of the first set of incident data received from the first user over incident data of the first set of incident data received from the second user, wherein correlating the first set of factors correlates the extracted semantic concepts to process variables and operating conditions;

receiving a second set of incident data, wherein the second set of incident data includes a second set of factors from a plurality of measurement devices located around an industrial plant, wherein the second set of factors comprise process variables and operating conditions;

determining a predicted severity of the second set of incident data based on the safety incident model and the second set of factors from the second set of incident data; and enabling a corrective action that would lower the predicted severity of the second set of factors.

2. The method of claim 1 further comprising:

receiving a third set of incident data about a third safety incident, wherein the third set of incident data includes a third set of factors and a severity of the third safety incident, wherein the first set of factors and the third set of factors are substantially similar, and wherein the severity of the third safety incident is greater than the severity of the first safety incident.

3. The method of claim 2, wherein creating the safety incident model is further based on the third set of incident data by correlating the third set of factors with the severity of the third safety incident; and wherein determining the predicted severity of the second set of incident data based on the safety incident model and the second set of factors from the second set of incident data further comprises assigning a weight to the severity of the third incident that is greater than a weight assigned to the severity of the first incident.

4. The method of claim 1, further comprising preparing the first set of incident data prior to creating the safety incident model based on the first set of incident data, wherein preparing the first set of incident data comprises removing irrelevant factors of the first set of factors based on known relationships received from a user.

5. The method of claim 1, wherein the predictive model is a decision tree model.

6. A computer program product for predicting a severity level for an incident, the computer program product comprising:

one or more non-transitory computer-readable storage devices and program instructions stored on at least one of the one or more tangible storage devices, the program instructions comprising:

program instructions to receive a first set of incident data about a first safety incident, wherein the first set of incident data includes a first set of factors and a severity of the first safety incident, wherein the program instructions to receive the first set of incident data about the first safety incident further comprises program instructions to receive the first set of incident data from a first user and a second user, and wherein the first set of incident data includes written reports of safety incidents, process variables and operating conditions;

program instructions to prepare the first set of incident data by determining two factors of the first set of factors that are statistically similar, and retaining only one of the two statistically similar factors in the first set of incident data, wherein the program instructions to prepare the first set of incident data comprise program instructions to remove irrelevant factors of the first set of factors based on known relationships received from a third user, and wherein the program instructions to prepare the first set of incident data comprises the program instructions to extract semantic concepts from the written reports;

program instructions to create a safety incident model based on the first set of incident data by correlating the first set of factors with the severity of the first safety incident, wherein the program instructions to create the safety incident model further comprises program instructions to allocate a higher weight to incident data of the first set of incident data received from the first user over incident data of the first set of incident data received from the second user, wherein program instructions to correlate the first set of factors correlates the extracted semantic concepts to process variables and operating conditions;

program instructions to receive a second set of incident data, wherein the second set of incident data includes a second set of factors from a plurality of measurement devices located around an industrial plant, wherein the second set of factors comprise process variables and operating conditions;

program instructions to determine a predicted severity of the second set of incident data based on the safety incident model and the second set of factors from the second set of incident data; and program instructions to enable a corrective action display a process change that would lower the predicted severity of the second set of factors.

7. The computer program product of claim 6 further comprising:

the program instructions to receive a third set of incident data about a third safety incident, wherein the third set of incident data includes a third set of factors and a severity of the third safety incident, and wherein the first set of factors and the third set of factors are substantially similar, and wherein the severity of the third safety incident is greater than the severity of the first safety incident.

8. The computer program product of claim 7, wherein the program instructions to create the safety incident model is further based on the third set of incident data by correlating the third set of factors with the severity of the third safety incident; and wherein the program instructions to determine the predicted severity of the second set of incident data based on the safety incident model and the second set of factors from the second set of incident data further comprises assigning a weight to the severity of the third incident that is greater than a weight assigned to the severity of the first incident.

9. The computer program product of claim 6, further comprising program instructions to prepare the first set of incident data prior to creating the safety incident model based on the first set of incident data, wherein the program instructions to prepare the first set of incident data comprises program instructions to remove irrelevant factors of the first set of factors based on known relationships received from a user.

10. The computer program product of claim 6, wherein the predictive model is a decision tree model.

11. A computer system for predicting a severity level for an incident, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive a first set of incident data about a first safety incident, wherein the first set of incident data includes a first set of factors and a severity of the first safety incident, wherein the program instructions to receive the first set of incident data about the first safety incident further comprises program instructions to receive the first set of incident data from a first user and a second user, and wherein the first set of incident data includes written reports of safety incidents, process variables and operating conditions;
program instructions to prepare the first set of incident data by determining two factors of the first set of factors that are statistically similar, and retaining only one of the two statistically similar factors in the first set of incident data, wherein the program instructions to prepare the first set of incident data comprise program instructions to remove irrelevant factors of the first set of factors based on known relationships received from a third user, and wherein the program instructions to prepare the first set of incident data comprises the program instructions to extract semantic concepts from the written reports;
program instructions to create a safety incident model based on the first set of incident data by correlating the first set of factors with the severity of the first safety incident, wherein the program instructions to create the safety incident model further comprises program instructions to allocate a higher weight to incident data of the first set of incident data received from the first user over incident data of the first set of incident data received from the second user, wherein program instructions to correlate the first set of factors correlates the extracted semantic concepts to process variables and operating conditions;
program instructions to receive a second set of incident data, wherein the second set of incident data includes a second set of factors from a plurality of measurement devices located around an industrial plant, wherein the second set of factors comprise process variables and operating conditions;
program instructions to determine a predicted severity of the second set of incident data based on the safety incident model and the second set of factors from the second set of incident data; and
program instructions to enable a corrective action that would lower the predicted severity of the second set of factors.

12. The computer system of claim 11 further comprising:
the program instructions to receive a third set of incident data about a third safety incident, wherein the third set of incident data includes a third set of factors and a severity of the third safety incident, and wherein the first set of factors and the third set of factors are substantially similar, and wherein the severity of the third safety incident is greater than the severity of the first safety incident.

13. The computer system of claim 12, wherein the program instructions to create the the safety incident model is further based on the third set of incident data by correlating the third set of factors with the severity of the third safety incident; and
wherein the program instructions to determine the predicted severity of the second set of incident data based on the safety incident model and the second set of factors from the second set of incident data, wherein the severity of the third incident has greater weight towards the predicted severity determined by the safety incident model than the severity of the first incident.

14. The computer system of claim 11, further comprising program instructions to prepare the first set of incident data prior to creating the safety incident model based on the first set of incident data, wherein the program instructions to prepare the first set of incident data comprises program instructions to remove irrelevant factors of the first set of factors based on known relationships received from a user.

* * * * *